United States Patent [19]

Dumbaugh, Jr. et al.

[11] 3,978,362

[45] Aug. 31, 1976

[54] GLASS ENVELOPE FOR TUNGSTEN-BROMINE LAMP

[75] Inventors: William H. Dumbaugh, Jr., Painted Post, N.Y.; Roger R. Genisson, Samoreau; Michel R. Lestrat, Avon, both of France

[73] Assignee: Corning Glass Works, Corning, N.Y.

[22] Filed: Aug. 7, 1975

[21] Appl. No.: 602,778

[52] U.S. Cl. .................................. 313/221; 106/52; 313/222
[51] Int. Cl.² ..................... H01K 1/28; H01K 1/50; H01K 7/00
[58] Field of Search ............... 313/221, 222; 106/52

[56] References Cited
UNITED STATES PATENTS

| | | | |
|---|---|---|---|
| 3,496,401 | 2/1970 | Dumbaugh | 313/221 |
| 3,798,491 | 3/1974 | Malm | 313/221 |
| 3,851,200 | 11/1974 | Thomasson | 313/221 |

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

The invention relates to glasses especially suitable for the envelope of a tungsten-bromine incandescent lamp and which can be sealed directly to molybdenum. Such glasses exhibit strain points in excess of 700°C., a viscosity at the liquidus, of at least 100,000 poises, and a coefficient of thermal expansion (0°–300°C.) between about 48–55 × $10^{-7}$/°C. More particularly, such glasses consist essentially, by weight on the oxide basis, of about 58–63% $SiO_2$, 13–16% $Al_2O_3$, 14–21% CaO, 0–5% MgO, and 0–7% BaO, the total CaO + MgO + BaO constituting at least about 19%.

3 Claims, 2 Drawing Figures

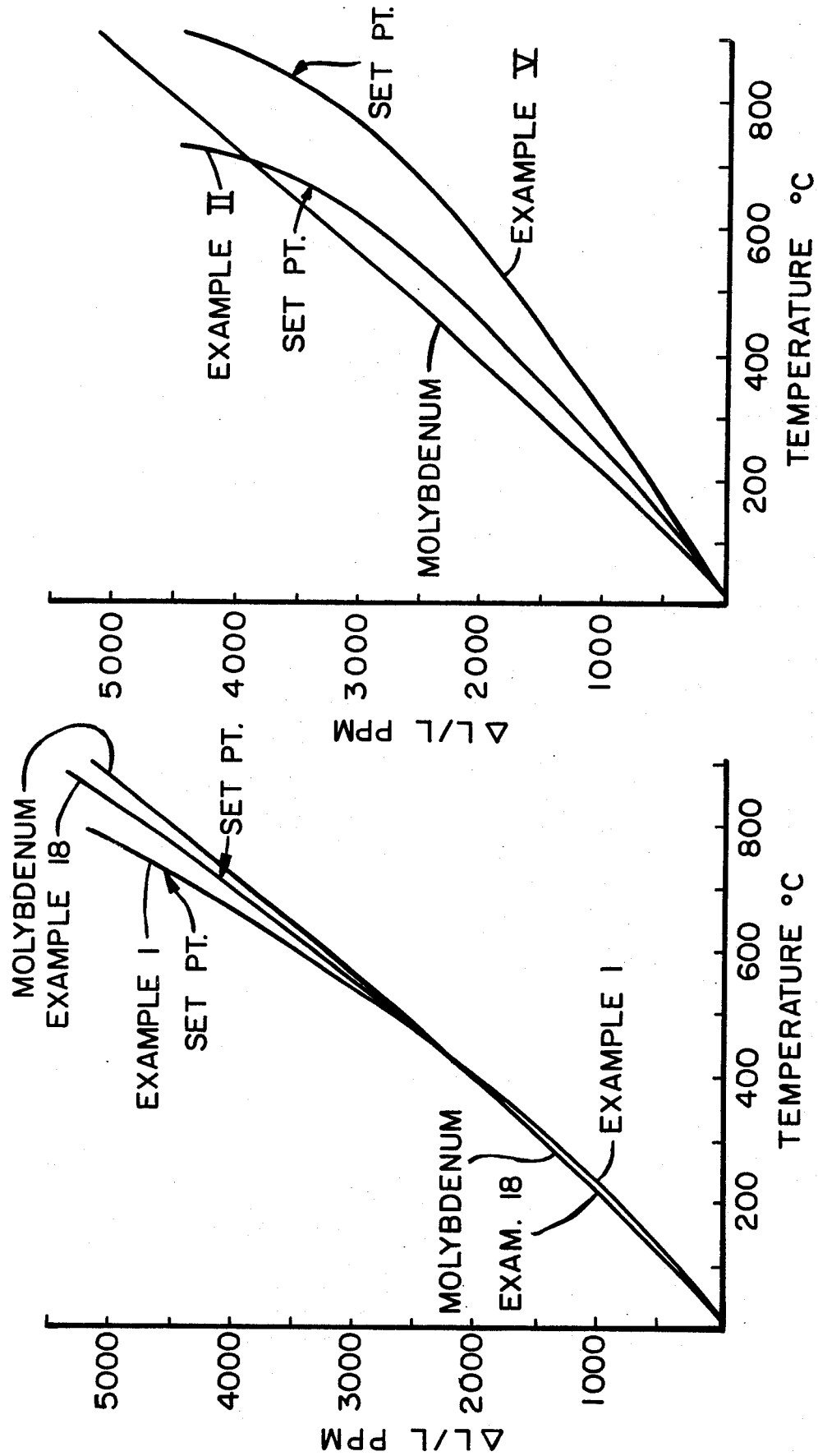

GLASS ENVELOPE FOR TUNGSTEN-BROMINE LAMP

BACKGROUND OF THE INVENTION

U.S. Pat. No. 3,496,401, of which one of the present inventors is the patentee, discloses the mechanism involved in the operation of tungsten-iodine incandescent lamps and provides glass compositions especially suitable as envelopes for such lamps. Thus, as is explained therein, molecular iodine is used in such lamps to inhibit blackening of the envelope and to improve bulb life by redepositing evaporated tungsten on the filament. During operation of the lamp, tungsten moves from the filament to the envelope wall by normal evaporation and diffusion. The molecular iodine placed within the lamp is converted by pyrolysis, in the close proximity of the filament, to iodine atoms which diffuse to the wall of the envelope and there react with adsorbed tungsten to form tungsten iodide which, being volatile, diffuses to the filament. The tungsten iodide is decomposed at the filament, leading to the deposition of tungsten on the filament and the production of iodine atoms, which then again migrate to the envelope wall to begin the cycle anew. As can be recognized, the mechanism and conditions for the regenerative action of the tungsten-iodine cycle is founded in the iodine-molecular dissociation and the formation and decomposition of tungsten iodide.

Initial attempts to employ gaseous bromine and chlorine in place of iodine were commercially unsuccessful because of the increased reactivity of those halogens when compared with iodine. The tungsten supports and leads were rapidly attacked such that lamp life was severely reduced. However, because (1) it is easier to keep the bromine cycle going than the iodine cycle (larger concentration range), (2) the light emitted by the bromine lamp is whiter than that of the iodine lamp, and (3) the inherent economics that could be enjoyed employing bromine, further investigation was undertaken which demonstrated that gaseous hydrogen bromine (HBr), resulting from the decomposition of a bromine-containing hydrocarbon, was thermally stable at the temperatures seen by the molybdenum or tungsten supports and leads and, therefore, protected those elements against bromide attack. This has resulted in making tungsten-bromine lamps, operating in a manner generally similar to tungsten-iodine lamps, now practical.

As was observed in U.S. Pat. No. 3,496,401, supra, envelopes or bulbs for the tungsten-iodine lamps were made of fused quartz or 96% silica compositions sold under the trademark VYCOR because of their ability to withstand the very high operating temperatures encountered during lamp operation. Thus, glasses are required which have strain points in excess of 700°C. to avoid the deformation at operating temperatures. (The strain point of a glass is considered to be the temperature at which the internal stress is substantially relieved and corresponds to a viscosity of $10^{14.5}$ poises when measured in accordance with ASTM Method Designation C336.) Nevertheless, fused quartz and 96% silica glasses are difficult to lamp work and have such low coefficients of thermal expansion that expensive molybdenum-foil seals must be utilized to introduce the lead wires into the lamps.

The alkaline earth aluminosilicate glasses disclosed in U.S. Pat. No. 3,496,401, supra, were specifically designed for use in the tungsten-iodine lamps. Such glasses consisted essentially, by weight, of 10–25% of an alkaline earth metal oxide, 13–25% $Al_2O_3$, 55–70% $SiO_2$, 0–10% $B_2O_3$, and less than about 0.1% of alkali metal oxide. The patentee had noted that the presence of more than about 0.1% alkali metal oxide resulted in a white coating being developed on the inner surface of the lamp envelope. While such glasses were, indeed, superior in lamp working properties to fused quartz and 96% silica glasses and their coefficients of thermal expansion considerably higher so as to be more compatible with tungsten, the melting temperatures demanded for melting such glasses exceeded the capabilities of conventional melting units and necessarily led to severe attack of the melting unit refractories.

SUMMARY OF THE INVENTION

Therefore, the principal objectives of the instant invention are seven. First, to provide a glass exhibiting a strain point in excess of 700°C. Second, to provide a glass having a coefficient of thermal expansion in the range of about 48–55 × $10^{-7}$/°C. (0°–300°C.) so as to be compatible with molybdenum. Thus, the use of molybdenum lead wires and supports is economically more attractive than utilizing tungsten for those purposes. Hence, tungsten will be used solely for the filament of the lamp. Preferably, the expansion of the glass will be higher than that of molybdenum at the set point of the glass but this difference will not exceed about 250 PPM. (The set point has been defined as a temperature 5°C. above the strain point of a glass.) Third, to provide a glass capable of being melted at temperatures no higher than about 1550°C. Fourth, to provide a glass capable of being formed into tubing by the Vello method and having a viscosity at the liquidus of at least 100,000 poises. Fifth, to provide a glass having an internal liquidus temperature less than about 1200°C. Sixth, to provide a glass which will not develop a white coating during operation of the lamp. Seventh, to provide a glass exhibiting (in contrast to fused silica and 96% silica glasses) very low hydrogen permeability, such that in the HBr reaction the hydrogen is retained within the envelope and is not permitted to diffuse through the wall.

We have learned that these objectives can be achieved where the envelope for a tungsten-bromine lamp is fabricated from glasses having compositions within the ranges of about 14–21% CaO, 0–5% MgO, 0–7% BaO, the total MgO + BaO + CaO being at least about 19%, 13–16% $Al_2O_3$, and 58–63% $SiO_2$. The alkali metal oxides will preferably be completely absent with none being purposely added such that impurity amounts only, if any, will be present. $B_2O_3$ will also preferably be absent since its presence sharply affects the low temperature viscosity of the glass, resulting in a lowering of the strain point of the glass.

DESCRIPTION OF THE PREFERRED EMBODIMENTS

Table I sets forth a group of glass compositions, reported in weight percent on the oxide basis, useful in understanding the instant invention. The actual batch ingredients can be the oxides or other compounds which, when melted together, are converted into the desired oxide in the proper proportions. In the examples recorded in Table I, the following batch materials of high purity were utilized:

Sand

Calcined alumina

Calcium carbonate

Magnesium oxide

Barium carbonate

Strontium carbonate

Lanthanum oxide

The batch materials were ballmilled together to aid in securing a homogeneous melt and then run into a platinum crucible. After placing a lid on the crucible, it was placed within an electrically-fired furnace operating at 1550°C. and maintained therewithin for about 16 hours. (It will be appreciated that larger melts can be made in pots or continuous melting units, where desired.) The crucible was poured into a steel mold to yield a slab about 6 inches × 6 inches × ½ inch and this slab was immediately transferred to an annealer operating at about 760°C. Example 1, representing the eutectic in the calcium aluminosilicate composition system, was chosen as the point of departure for the present study.

Table II records measurements of various physical properties determined in accordance with techniques conventional to the glass art. The coefficients of thermal expansion were measured over the range of 0°–300°C. and are reported in terms of × $10^{-7}$/°C. Durability values were determined on polished plates immersed in a 5% aqueous solution of HCl for 24 hours at 95°C. and on polished plates immersed in a 0.02N $Na_2CO_3$ aqueous solution at 95°C. for six hours. Weight loss in mg/cm$^2$ and any change in polished appearance where observed are reported. The softening point, annealing point, strain point, and internal liquidus are tabulated in °C. Density is recorded as g/cm$^3$ and viscosity is recited in terms of poises. The expansion mismatch between molybdenum and the glass at the set point thereof is expressed in parts per million (PPM), a + indicating the glass has a higher expansion than molybdenum, thereby resulting in a radial compression seal which is desired for sealing a metal lead into a glass envelope. Electrical resistivity, reported as Log $\rho$ at different temperatures, is defined in terms of ohm-cm.

FIG. 1 compares the thermal expansion curves of Example 1 and Example 18, the preferred glass of the instant invention, with molybdenum at temperatures up to 900°C. It will be observed that the mismatch between molybdenum and Example 1 at the set point is about 450 PPM, whereas that existing between molybdenum and Example 18 is about 175 PPM.

FIG. 2 compares the thermal expansion curves of Examples II and V of U.S. Pat. No. 3,496,401, supra, with molybdenum at temperatures up to 900°C. It will be noted that the expansion of those glasses at the set points thereof is less than that of molybdenum. This results in the development of radial stress in tension, generally leading to unsatisfactory seals.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 62.1 | 62.5 | 62.9 | 63.4 | 64.2 | 60.7 | 60.2 | 59.9 | 60.6 | 60.5 | 61.4 | 61.3 | 61.1 |
| $Al_2O_3$ | 14.6 | 14.8 | 14.9 | 15.0 | 15.3 | 14.4 | 14.4 | 14.2 | 14.2 | 14.4 | 14.6 | 12.7 | 14.5 |
| CaO | 23.3 | 20.9 | 18.7 | 16.3 | 13.3 | 13.3 | 15.5 | 17.8 | 18.7 | 10.9 | 15.9 | 13.4 | 18.1 |
| MgO | — | 1.8 | 3.5 | 5.3 | 7.2 | 5.1 | 3.4 | 1.7 | 1.4 | 5.1 | 3.5 | 3.5 | 1.7 |
| BaO | — | — | — | — | — | 6.5 | 6.5 | 6.4 | 5.1 | — | — | — | — |
| SrO | — | — | — | — | — | — | — | — | — | 8.8 | 4.4 | 8.9 | 4.4 |

|  | 14 | 15 | 16 | 17 | 18 |
|---|---|---|---|---|---|
| $SiO_2$ | 61.1 | 58.3 | 60.7 | 58.0 | 60.3 |
| $Al_2O_3$ | 14.2 | 13.4 | 14.6 | 13.8 | 14.3 |
| CaO | 15.5 | 12.3 | 14.9 | 11.8 | 18.8 |
| MgO | 3.4 | 3.2 | 3.6 | 3.3 | 1.4 |
| BaO | — | — | 3.4 | 6.2 | 5.2 |
| SrO | — | — | — | 4.2 | — |
| $La_2O_3$ | 6.8 | 12.8 | 2.8 | 2.7 | — |

TABLE II

|  | 1 | 2 | 3 | 4 | 5 | 6 | 7 | 8 | 9 | 10 | 11 | 12 | 13 |
|---|---|---|---|---|---|---|---|---|---|---|---|---|---|
| Soft. Pt. | 952 | — | — | — | — | — | — | — | — | — | — | — | — |
| Ann. Pt. | 772 | 759 | 755 | 755 | 750 | 752 | 747 | 754 | 752 | 741 | 751 | 743 | 746 |
| Str. Pt. | 728 | 714 | 712 | 708 | 705 | 707 | 703 | 713 | 705 | 694 | 705 | 698 | 700 |
| Exp. Coef. | 55 | 52.6 | 51.4 | 48.0 | 44.9 | 48.5 | 50.9 | 53.2 | 52.6 | 49.0 | 51.7 | 52.1 | 53.5 |
| Density | 2.62 | — | — | — | — | — | — | — | — | — | — | — | — |
| Liquidus | 1139 | 1164 | 1164 | 1218 | 1273 | 1201 | 1148 | 1095 | 1124 | 1157 | 1142 | 1166 | 1169 |
| Visc. at Liq. | 35000 | — | — | — | — | — | — | — | — | — | — | — | — |
| Visc. at 1500°C. | — | — | — | — | — | — | — | — | — | — | — | — | — |
| Mismatch to Mo | +450 | — | — | — | — | — | — | +180 | +160 | — | — | — | — |
| Log $\rho$ 250°C. | — | — | — | — | — | — | — | — | — | — | — | — | — |
| 350°C. | — | — | — | — | — | — | — | — | — | — | — | — | — |
| 5% HCl | 0.04 | — | — | — | — | — | — | — | — | — | — | — | — |
| 0.02N $Na_2CO_3$ | — | — | — | — | — | — | — | — | — | — | — | — | — |

|  | 14 | 15 | 16 | 17 | 18 |
|---|---|---|---|---|---|
| Soft. Pt. | — | — | — | — | 953 |
| Ann. Pt. | 752 | 756 | 753 | 745 | 753 |
| Str. Pt. | 705 | 708 | 706 | 692 | 707 |

TABLE II-continued

| | | | | | |
|---|---|---|---|---|---|
| Exp. Coef. | 50.4 | 48.3 | 49.4 | 51.7 | 53.0 |
| Density | — | — | — | — | 2.670 |
| Liquidus | 1163 | 1278 | 1137 | 1119 | 1109 |
| Visc. at Liq. | — | — | — | — | 120,000 |
| Visc. at 1500°C. | — | — | — | — | 195 |
| Mismatch to Mo | — | +25 | +50 | +100 | +175 |
| Log $\rho$ 250°C. | — | — | — | — | 15.9 |
| 350°C. | — | — | — | — | 13.0 |
| 5% HCl | — | — | — | — | 0.02 |
| 0.02N $Na_2CO_3$ | — | — | — | — | 0.06 |

As can be observed from Table I, additions of $SiO_2$ or $Al_2O_3$ to the $CaO-Al_2O_3-SiO_2$ eutectic composition (Example 1) will commonly reduce the coefficient of expansion of the base glass but, at the same time, will raise the liquidus temperature and melting viscosity to unacceptable levels. The substitution of MgO for CaO likewise generally decreases the coefficient of expansion but raises the liquidus temperature. In contrast, the substitution of BaO for CaO acts to sharply reduce the liquidus temperature while causing the coefficient of thermal expansion to be increased slightly. SrO, when substituted for CaO, appears to have some effect upon lowering the liquidus temperature, but far less than that demonstrated by BaO. $La_2O_3$ is shown to be useful in achieving low liquidus values with high strain points while adjusting the coefficient of expansion. However, the relative high cost of $La_2O_3$ severely restricts its use. The criticality of maintaining close composition control is evidenced from an examination of Examples 1, 4, 5, 6, 10, 12, 15, and 17 which have compositions just outside the operable ranges and do not exhibit the desired physical properties.

FIGS. 1 and 2 are particularly helpful in illustrating the critical composition control that must be maintained to achieve the desired high temperature and low temperature viscosity characteristics and coefficient of thermal expansion.

No white coating or other deposit on the wall of the glass envelope has been observed after bulb operation and the very compacted structure of the inventive glasses results in very low hydrogen permeability therethrough.

In general, the preferred glasses will be formulated solely from the quinary system $MgO-CaO-BaO-Al_2O_3-SiO_2$ with all extraneous additions held to less than about 3%, except for SrO and/or $La_2O_3$ which may be present up to a total of about 10%. These preferred glasses will consist essentially, by weight, of about 1-5% MgO, 2-7% BaO, 13-16% $Al_2O_3$, 16-20% CaO, and 58-63% $SiO_2$.

We claim:

1. A tungsten-bromine incandescent lamp having an envelope made from a glass exhibiting a strain point above 700°C., a coefficient of thermal expansion (0°-300°C.) in the range of about 48-55 × $10^{-7}$/°C., a mismatch with molybdenum metal at the set point of the glass not exceeding about 250 PPM, an operable melting temperature not in excess of about 1550°C., a viscosity at the liquidus temperature of at least 100,000 poises, a liquidus temperature less than about 1200°C., and a very low permeability to hydrogen, said glass consisting essentially, by weight on the oxide basis, of about 14-21% CaO, 0-5% MgO, 0-7% BaO, the total CaO + MgO + BaO being at least 19%, 13-16% $Al_2O_3$, and 58-63% $SiO_2$.

2. A tungsten-bromine incandescent lamp according to claim 1 wherein said glass also contains up to 10% total of SrO and/or $La_2O_3$.

3. A tungsten-bromine incandescent lamp according to claim 1 wherein said glass consists essentially, by weight on the oxide basis, of about 1-5% MgO, 2-7% BaO, 16-20% CaO, 13-16% $Al_2O_3$, and 58-63% $SiO_2$.

* * * * *